United States Patent [19]

Ericsson

[11] 4,246,465
[45] Jan. 20, 1981

[54] PULSED-ARC D.C. TIG WELDING APPARATUS

[75] Inventor: Rolf Ericsson, Laxa, Sweden

[73] Assignee: ESAB Aktiebolag, Sweden

[21] Appl. No.: 879,481

[22] Filed: Feb. 21, 1978

[30] Foreign Application Priority Data

Feb. 28, 1977 [SE] Sweden .............................. 7702147

[51] Int. Cl.³ .............................................. B23K 9/09
[52] U.S. Cl. ............................ 219/130.51; 219/130.31
[58] Field of Search ................ 219/130.51, 137 PS, 219/130.31, 130.21

[56] References Cited

U.S. PATENT DOCUMENTS 3,588,466 6/1971 Daggett ..................... 219/137 PS
3,902,037 8/1975 Goto et al. .................. 219/130.51

FOREIGN PATENT DOCUMENTS 51-37050 3/1976 Japan ................................ 219/130.51
51-59050 5/1976 Japan ................................ 219/130.51
51-69451 6/1976 Japan ................................ 219/130.51

Primary Examiner—C. C. Shaw
Attorney, Agent, or Firm—Lerner, David, Littenberg & Samuel

[57] ABSTRACT

An arc welding apparatus for pulsed arc welding includes a silicon controlled rectifier and an uncontrolled rectifier the D.C. outputs of which are connected in parallel to a non-consumable electrode and a workpiece, respectively. The silicon controlled rectifier delivers a background welding current to the arc between the electrode and the workpiece. The D.C. outputs of the uncontrolled rectifier are connected in series with transistors controlled by signals to regulate the flow of current supplied from this rectifier to the arc to provide periodically recurring welding current pulses of predetermined length and amplitude to the arc in addition to the background welding current delivered by the silicon controlled rectifier.

2 Claims, 1 Drawing Figure

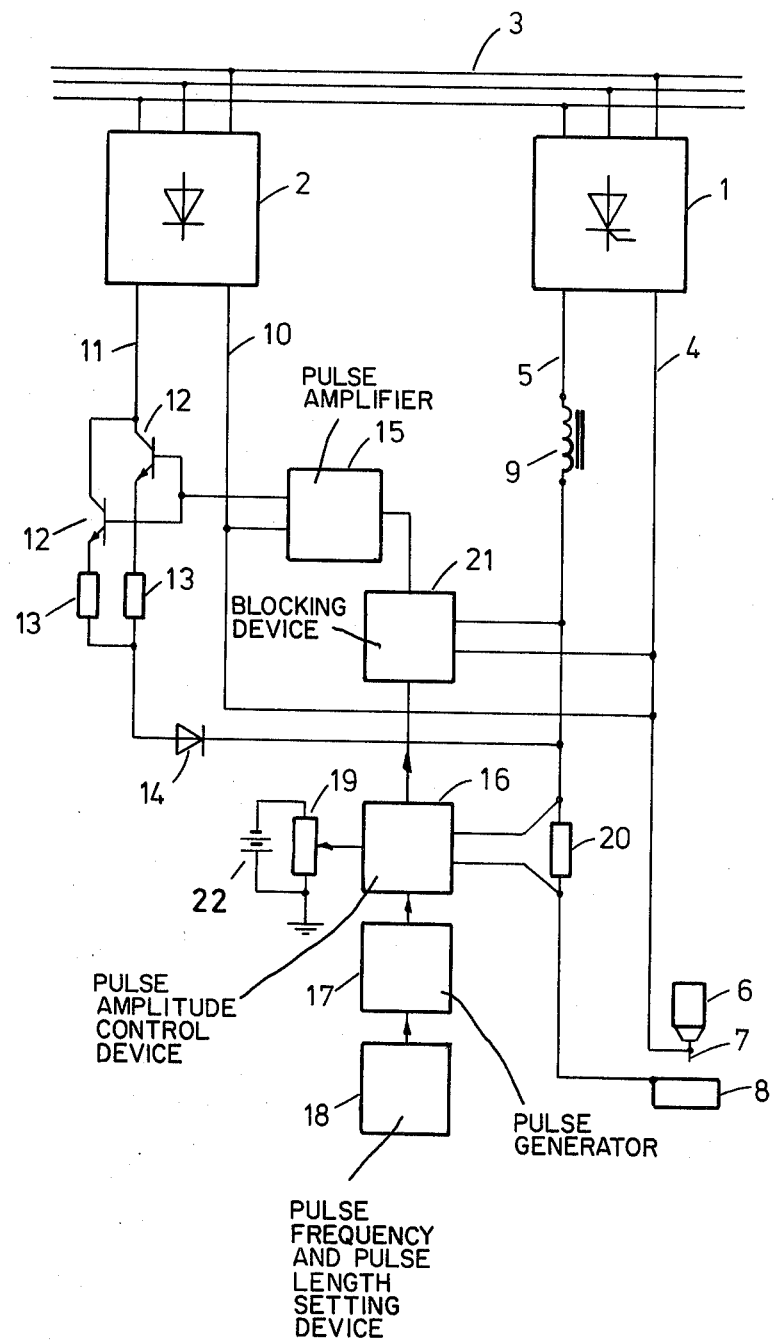

PULSED-ARC D.C. TIG WELDING APPARATUS

BACKGROUND OF THE INVENTION

Pulsed D.C. TIG (tungsten inert gas) welding has already been used to advantage in the welding of a variety of special materials particularly in the welding of thin plates. The basic principle of this welding method is cyclically to vary the current between a background level and a higher pulse level of same polarity. The power sources used for this welding method are provided with means for adjusting the frequency, the duration and the amplitude of the pulses.

Welding power sources of this kind generally include silicon controlled rectifiers (SCR) or are wholly transistorized. Contrary to the SCR power sources the transistorized power source has considerable power losses and therefore have only been used in the welding with low currents.

SUMMARY OF THE INVENTION

This invention relates to the pulsed arc welding technique and particularly to an arc welding apparatus for pulsed arc welding. The invention is intended to provide a new and improved apparatus for this purpose which has an improved control rate and low power losses. It is a principal object of the invention to provide an arc welding apparatus whcih comprises an A.C. power supply, a SCR system provided with A.C. terminals connected to said A.C. power supply and with D.C. terminals connected by a first and second current conductor to a non-consumable electrode and a workpiece, respectively, to maintain an arc between said electrode and said workpiece, one of said first and second current conductors connecting an inductor in series with the eletrode for smoothing the welding current delivered from said SCR system, a D.C. power supply connected in parallel by a third and a fourth current conductor to said non-consumable electrode and said workpiece, respectively, one of said third and fourth current conductors containing transistor means in series to said electrode, means for producing an adjustable control signal to regulate the flow of current through said transistor means when being in their conducting state to provide periodically recurring welding current pulses of predetermined length and amplitude in addition to the welding current delivered by the SCR system.

The transistors are loaded only by the short pulse currents in addition to the background current. The pulses have a rectangular waveform and their duration, frequency and amplitude can easily be controlled. The background current is delivered from the SCR unit and causes only small losses.

Another object of the invention is to provide an arc welding apparatus which comprises an A.C. power supply, a SCR rectifier system provided with A.C. terminals connected to said A.C. power supply and with D.C. terminals connected by a first and a second current conductor to a non-consumable electrode and a workpiece, respectively, to maintain an arc between said electrode and said workpiece, one of said first and second current conductors connecting an inductor in series with the electrode for smoothing the welding current delivered from said SCR system, a D.C. power supply connected in parallel by a third and a fourth current conductor to said non-consumable electrode and said workpiece, respectively, one of said third and fourth current conductors containing transistor means in series to said electrode, sensing means producing a voltage signal corresponding to the actual value of the total welding current composed of the welding current delivered by said SCR system and for welding current delivered by said D.C. power supply, means for producing a voltage signal corresponding to a predetermined value of the total current, means for producing an adjustable control signal to regulate the flow of current through said transistor means when being in their conducting state to provide periodically recurring welding current pulses of predetermined length and amplitude to the arc in addition to the welding current delivered by the SCR system including means for comparing said voltage signal corresponding to the actual value of the total welding current with said voltage signal corresponding to the predetermined value of the total welding current to generate an error signal and means to control the amplitude of said welding current pulses in response to said error signal.

Other features, advantages and benefits of the present invention will become apparent from the following description of an embodiment of the invention taken in conjunction with the accompanying drawing.

BRIEF DESCRIPTION OF THE DRAWINGS

The single FIGURE shows a schematic block diagram of a circuit for practicing the disclosed invention.

DESCRIPTION OF THE PREFFERED EMBODIMENT

A silicon controlled rectifier (SCR) unit 1 is connected to a three-phase power system 3. Rectifier units of this kind are well known in the art. The SCR unit is provided with a transformer supplying the SCR element with a suitable voltage. The SCR elements are controlled by a triggering unit forming part of the SCR unit and not shown here. The SCR unit can be composed partly of SCR elements and partly of uncontrolled diodes depending on the interconnection of the elements, e.g., when providing a three-phase bridge connection of six rectifier elements only three of them forming one branch of the bridge must be SCR elements.

The two D.C. outputs of the SCR-unit are connected by conductors 4, 5 to a non-consumable electrode 7 of a welding torch 6 and a workpiece 8, respectively. An inductor 9 is provided to smooth the ripple of the D.C. voltage supplied by the SCR unit 1.

A rectifier unit 2 is also connected to the three-phase power system 3. This rectifier unit contains a transformer supplying uncontrolled rectifier elements, e.g. diodes, with a suitable voltage. The diodes are interconnected so as to form a rectifier. It is not necessary but expedient that the same A.C. system supplies the SCR unit 1 and the rectifier unit 2. Moreover, the rectifier unit 2 can be replaced by a battery of any kind.

The D.C. outputs of the rectifier unit 2 are connected by conductors 10, 11 to the electrode 7 and the workpiece 8, respectively, and in parallel to the D.C. outputs of the SCR unit 1. The conductor 11 contains a parallel connection of power transistors 12 the emitters of which are connected in series with resistors 13. The resistors 13 are small balancing resistors which are used in accordance with usual practice so as to balance the internal characteristics of the transistors 12. If necessary, an inductor may be connected between the rectifier 2 and the transistors 12 for smoothing the ripple of the D.C. voltage.

The number of transistors connected in parallel depends on the current which shall be delivered from the rectifier unit 2 to the welding arc between the electrodes 7 and the workpiece 8. It also depends on the duration of the current pulses and the pauses between the pulses. A diode 14 prevents reverse current from flowing through the transistors which could damage them.

A pulse generator 17 is provided with an adjustment device 18 for adjusting the frequency and the duration of pulse signals delivered to a control device 16. The voltage over a measuring resistor 20 corresponds to the actual total welding current and is applied to the control device, where this voltage is compared with a voltage corresponding to a predetermined value of the welding current supplied from a signal producing device containing a voltage source 22 and a potentiometer 19. The amplitude of the signal from the pulse generator 17 is modified when passing the control device by the error signal which corresponds to the difference between the voltage signal depending on the actual total welding current and the voltage signal corresponding to the predetermined value of the current. Therefore, the output signal from the control device which is applied to the base of each of the transistors 12 does not only control the switching state of the transistors 12 but also the flow of current through the transistors during their conducting state.

The output signal from the control signal passes a blocking device 21 and a pulse amplifier 15. The blocking device is controlled by the voltage between the electrode and the workpiece. If the voltage for any reason is below a predetermined adjustable level the output signal of the control device 16 will be modified so as to switch the transistors 12 into their non-conducting state and to hold them in this state as long as the voltage between the electrode and the workpiece is too low. Thereby the transistors are prevented from damaging by an unallowable increase of the pulse current, e.g. because of a short-circuit between the electrode and the workpiece.

It will be reailized that the circuits shown in blocks may be made through the use and exercise of routine electronic skill.

A welding apparatus of the kind described is particularly suitable for welding with short current pulses—up to appr. 20 ms—and long pauses—longer than 6 times the pulse duration—during which only the background arc current from the SCR unit is supplied to the arc. For example, when welding 1 mm thick rustproof plate the background current was 70 A and the pulse current 100 A, i.e. the total current was 170 A during the pulse period. The pulse length was appr. 6 ms and the pause length appr. 200 ms.

I claim:

1. Arc welding apparatus comprising:

silicon controlled rectifier means for receiving power from an A.C. supply and providing D.C. power to a non-consumable electrode and workpiece, said silicon controlled rectifier means being connected by first and second current conductor means to said non-consumable electrode and workpiece, respectively, to maintain an arc between said electrode and said workpiece, one of said first and second current conductor means connecting an inductor in series with the electrode for smoothing the welding current delivered from said silicon controlled rectifier means;

third and fourth current conductor means for connecting a D.C. power supply to said non-consumable electrode and said workpiece, respectively, one of said third and fourth current conductor means having transistor means connected in series therewith;

means for producing an adjustable control signal for controlling the flow of current through said transistor means to provide periodically recurring welding current pulses of predetermined length and amplitude to the arc in addition to the welding current delivered by the silicon controlled rectifier means; and means for switching the transistor means to a non-conducting state independent of said adjustable control signal when the voltage between the electrode and the workpiece is below a predetermined level.

2. in pulsed current electric arc welding apparatus including means for connecting two sources of D.C. power in parallel to a common welding circuit which includes a non-consumable electrode and a workpiece, one of said sources of D.C. power for providing background current of substantially constant magnitude, and another of said sources including switching means for transmitting to said common welding circuit current pulses separated by intervals during which said background current only is flowing in the welding circuit, the improvement comprising welding voltage sensing means and means controlled by said sensing means for suppressing the transmission of current pulses by said switching means at any welding voltage level below a predetermined limit.

* * * * *